Patented Mar. 9, 1926.

1,576,363

UNITED STATES PATENT OFFICE.

MADELEINE ROSS, OF MONTREAL, QUEBEC, CANADA.

COMPOSITION FOR PREVENTING THE ACCUMULATION OF MOISTURE IN DROPLETS UPON GLASS OR OTHER POLISHED SURFACES.

No Drawing.　　Application filed December 22, 1924. Serial No. 757,578.

*To all whom it may concern:*

Be it known that I, MADELEINE ROSS, chemist, a British subject, residing at 271 Prince Arthur Street West, in the city of Montreal, Province of Quebec, and Dominion of Canada, have invented certain new and useful Improvements in and Relating to a Composition for Preventing the Accumulation of Moisture in Droplets Upon Glass or Other Polished Surfaces, of which the following is a full, clear, and exact description.

This invention relates to a composition for preventing the accumulation of moisture in droplets upon glass or other polished surfaces.

The object of the invention is to produce a material which may be readily applied to the surface of glass or similar articles and which will effectively prevent the accumulation of moisture in droplets on the glass.

The material of this invention is prepared as follows, from protein substances, their decomposition products or other colloids; the specific example described being applied to gelatine. A solution containing approximately equal parts of gelatine and water is treated separately with concentrated nitric acid and concentrated chromic acid and the resulting products are mixed together. The mixture may then be diluted to any desired strength. The proportion of acid used is preferably equal to about one-fifth the weight of the gelatine in each case.

The material thus prepared is applied to the surface to be protected and allowed to dry thereon producing a surface which will prevent moisture condensing thereon in droplets. The use of this material is particularly desirable in connection with dental mirrors, surveying instruments, eye glasses, binoculars, automobile wind shields, locomotive cab windows, show windows and with other transparent surfaces which should permit clear vision at all times.

When this material is properly applied to such surfaces it does not retard the vision but prevents condensation in droplets on the surfaces and removes a source of trouble in the various places outlined.

While the invention has been particularly described with reference to gelatine it is to be understood that other substances of the class mentioned come within the scope of the invention.

This invention is not limited to any special way of applying the material to the surface to be protected as obviously it may be applied in various ways.

I claim:

1. A process of producing a material for preventing the accumulation of moisture in droplets upon glass or other polished surface which consists in treating gelatine with concentrated nitric and chromic acids.

2. A process of producing a material for preventing the accumulation of moisture in droplets upon glass or other polished surface which consists in treating an aqueous solution of gelatine separately with concentrated nitric acid and concentrated chromic acid and mixing the resulting products.

3. A process of producing a material for preventing the accumulation of moisture in droplets upon glass or other polished surface which consists in treating an aqueous solution of gelatine separately with concentrated nitric acid and concentrated chromic acid, mixing the resulting products and diluting the mixture to the desired strength.

4. A process as defined in claim 3 in which the aqueous solution contains approximately equal parts of water and gelatine and the proportion of acids used is about one-fifth the weight of the gelatine.

5. A material for preventing the accumulation of moisture in droplets comprising a mixture of an aqueous solution of gelatine treated with concentrated nitric acid and an aqueous solution of gelatine treated with concentrated chromic acid, diluted to the extent desired.

In testimony whereof I affix my signature.

MADELEINE ROSS.